United States Patent Office 3,308,994
Patented Mar. 14, 1967

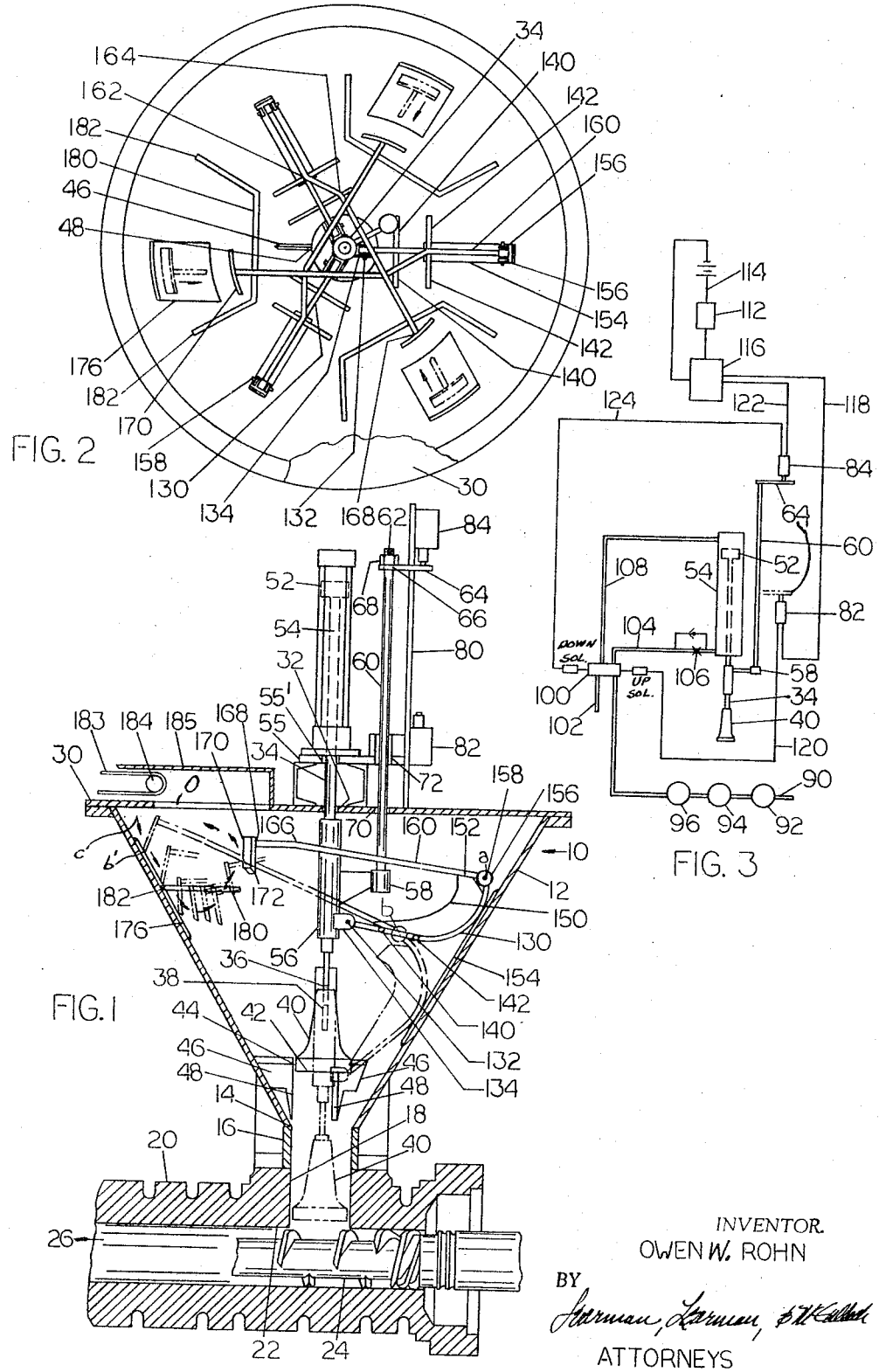

3,308,994
FEEDER APPARATUS
Owen W. Rohn, Saginaw, Mich., assignor to Baker Perkins Inc., Saginaw, Mich., a corporation of New York
Filed Apr. 7, 1965, Ser. No. 446,357
16 Claims. (Cl. 222—245)

The present invention relates to new and novel feeder apparatus, and more particularly to feeder apparatus including hopper means for feeding pulverulent or granulated products and the like to suitable chemical mixing machines or similar apparatus.

The feeder apparatus of the present invention is particularly directed to an arrangement wherein a hopper means is operatively associated with a feed screw in a mixer casing or the like and wherein the feed screw is adapted to convey material to the outlet of the casing for discharge therefrom.

Reciprocating means in the form of ram means is disposed within the hopper means and is mounted for movement toward and away from the outlet means of the hopper means. This ram means is adapted to force material from the hopper means downwardly through the outlet means of the hopper means and into the associated mixer casing.

The hopper means of this type of apparatus generally employs downwardly converging side wall portions, and upon reciprocation of the ram means, the material in the lower central portion of the hopper means will be fed downwardly through the outlet means thereof. It is apparent that upon withdrawal of the ram means through its initial position, the material within the hopper means should feed downwardly uniformly and steadily to fill in the void left by the material which has been forced outwardly by the ram means upon its downstroke. In the case of pulverulent or granulated products, the material does not always feed downwardly within the hopper means in the proper manner, and there is a tendency for the material to remain in place in the upper portions of the hopper means. Accordingly, it is a particular purpose of the present invention to provide an arrangement whereby material in the upper part of the hopper means is constantly upset and moved downwardly within the hopper means to constantly refill the discharge end of the hopper means so that the ram means will feed out a uniform supply of material to the associated mixer apparatus.

In order to accomplish the desired results, hoe means is employed which is pivotally interconnected with the ram means such that upon reciprocation of the ram means, the hoe means has a unique action such that it moves back and forth within the material and serves to scrape material downwardly along the inner surface of the side portion of the hopper means toward the outlet means.

In addition, finger means is associated with the hoe means, and upon movement of the hoe means, the finger means moves through the material within the hopper means so as to prevent bridging of the material which normally would occur. This dual action including the raking action and the movement of the fingers to prevent bridging assures proper flow of material downwardly to the discharge area of the hopper means.

The hoe means of the present invention is particularly advantageous in that it includes a minimum of parts thereby reducing the wear and tear on the apparatus and furthermore it is of very simple mechanical construction so as to reduce the cost thereof and to minimize the required maintenance. The structural arrangement is in fact of such simplicity as to be relatively foolproof in operation and to substantially increase the life expectancy of the apparatus.

An object of the present invention is to provide new and improved feeder apparatus for feeding pulverulent or granulated products therefrom and employing ram means.

Another object of the invention is the provision of feeder apparatus including means for constantly upsetting and moving the material in the hopper means so as to move the material downwardly toward the center of the hopper means to refill the discharge end thereof so as to be uniformly fed outwardly by the ram means.

Still another object of the invention is to provide feeder apparatus including means to prevent bridging of the material within the hopper means and to assure uniform and steady flow of material from the hopper means.

A further object of the invention is the provision of feeder apparatus including fewer mechanical parts subject to wear.

Still another object of the invention is to provide feeder apparatus which is quite simple and inexpensive in construction, and yet which is quite efficient and reliable in operation.

Other objects and many attendant advantages of the invention will become more apparent when considered in connection with the specification and accompanying drawings, wherein:

FIG. 1 is a vertical section through the apparatus of the present invention;

FIG. 2 is a top view of the apparatus shown in FIG. 1; and

FIG. 3 is a schematic illustration of the electrical and fluid pressure system for operating the power actuated means connected with the ram means of the apparatus.

Referring now to the drawings wherein like reference characters designate corresponding parts throughout the several views, the hopper means of the apparatus is indicated generally by reference numeral 10, this hopper means including a downwardly converging side portion 12 which may be for example substantially frusto-conical in configuration. The hopper means includes outlet means 14 at the bottom thereof in the form of an opening which is in communication with a neck portion indicated by reference numeral 16 which in turn is in communication with the inlet portion 18 of a mixer barrel or casing 20. Casing 20 is provided with an elongated bore 22 formed therethrough which is in communication with the inlet portion 18, and an extruder or mixer screw indicated generally by reference numeral 24 is rotatably supported within bore 22 and is adapted to convey or feed material to the discharge portion 26 of the casing in a well known manner. (See United States Patent No. 3,023,-455.)

The upper end of the hopper means includes a flat cover 30 which may include cross bracing of channel iron or the like for reinforcing, this cover having a central hole 32 formed therethrough through which a piston rod 34 of power actuating mechanism hereinafter described slidably extends. The lower end of piston rod 34 is threaded as indicated at 36 and is threaded within a suitable threaded hole 38 provided in the ram means 40. The ram means includes a lower downwardly facing flat surface 42 of generally circular cross section which is adapted to force the material within the hopper means downwardly through the outlet means 14 and the neck portion 16 as will hereinafter be more fully described.

The lower portion of ram means 40 includes an outer generally cylindrical surface 44, and a plurality of ram guide means which may be three in number are indicated by reference numeral 46, these ram guide means being disposed symmetrically about the inner surface of the hopper means and secured thereto. Each of the ram guide means 46 may be secured in position as by welding or the like and includes an innermost surface 48 adapted to cooperate with the cylindrical surface 44 on the ram means to assure that the ram means maintains proper alignment during its reciprocatory movement in the lowermost portion of the hopper means.

The piston rod 34 extends upwardly through hole 32 in the top cover 30 as aforesaid and is connected with a piston 52 which is reciprocably mounted within a conventional pneumatic cylinder 54 mounted upon a suitable support means 55 which is secured as by welding and the like to the cover 30. It will be noted that support means 55 is provided with a hole 55' through which the piston rod 34 is adapted to reciprocate to permit proper movement of the piston rod.

A sleeve 56 is suitably fixedly secured to the piston rod 34 and a lateral extension 58 extends radially outwardly from sleeve 56. A rod 60 is secured to the outer portion of the lateral extension 58 and extends vertically upwardly therefrom to terminate in an upper threaded end portion 62. An arm 64 is provided with a hole 66 which fits about the threaded end portion 62, and a nut 68 is threaded onto the end portion 62 to hold arm 64 in the operative position illustrated. Rod 60 extends slidably through a hole 70 provided in cover 30 and through a guiding collar portion 72 which may also be mounted on support means 55 aforedescribed.

A support member 80 extends upwardly from cover 30 and is suitably secured thereto as well as to the support portion 55, support member 80 serving to support a low limit switch 82 and a high limit switch 84.

Referring now to FIG. 3 of the drawings, the arrangement for operating the power actuated ram means is illustrated. A conduit 90 is connected with a suitable source of fluid pressure such as air and the like, a filter 92, a pressure regulator 94 and a lubricator unit 96 being connected in conduit 90. Fluid conduit 90 is in turn connected with a four-way solenoid operated valve indicated generally by reference numeral 100. A fluid conduit 104 extends from valve 100 to the lower end of pneumatic cylinder 54 through a flow control valve 106. A fluid conduit 108 extends from the valve 100 to the upper end of pneumatic cylinder 54. Valve 100 is also provided with an exhaust line 102 to atmosphere.

An electrical lead 114 is adapted to be connected with any suitable source of electrical power and is connected with an on/off switch 112 which controls the flow of electricity to pneumatic relay timer 116. An electrical lead 118 extends from the timer 116 to the low limit switch 82, and a further lead 120 extends from the low limit switch to the up solenoid portion of valve 100. An electrical lead 122 extends from timer 116 to the high limit switch 84, and a further lead 124 extends from the high limit switch to the down solenoid of valve 100.

The operation of this system will be described hereinafter.

The hoe means of the present invention includes a plurality of assemblies shown as being three in number which are symmetrically disposed about the sleeve member 56 and each of these assemblies is identical in construction. Accordingly, each of the assemblies has been given the same reference numeral, and a description of one of the assemblies will suffice for all of them. Each hoe means assembly includes an actuating arm 130 which is of generally arcuate configuration as seen in FIG. 1, the inner end of the actuating arm being pivotally supported by a pivot pin 132 mounted between a pair of outwardly spaced ears 134 fixedly secured as by welding or the like to the outer surface of sleeve member 56.

Each of the actuating arms includes a first pair of laterally extending fingers 140 which extend laterally outwardly from opposite sides of the associated arm. A second pair of spaced fingers 142 extend from opposite sides of the associated arm. These finger members 140 and 142 are adapted to move up and down to the material within the hopper means during reciprocation of the ram means so as to prevent bridging of the material within the hopper means. Each of the actuating arms also has secured to the upper surface thereof gusset plate means 150 which is suitably secured thereto as by welding or the like, this gusset plate means including a flat limit stop surface 152 for a purpose hereinafter described. This gusset plate accordingly serves the function of the limit stop means as well as serving to reinforce and rigidify the actuating arm.

Three wear plates 154 are secured as by welding to the inner surface of the hopper means, each of these wear plates being suitably spaced about the inner surface of the hopper means so as to be in a position such that one of the actuating arms 130 is adapted to slidably engage an associated wear plate. It is evident that the arcuate outer surface of each of the actuating arms 130 will slide along an associated wear plate 154, this wear plate serving to prevent undue wear to the side portion of the hopper means.

The opposite end portion of each of the actuating arms 130 is bifurcated to provide two spaced portions 156 which receive a pivot pin 158 which pivotally supports one end portion of an elongated hoe member 160. As seen particularly in FIG. 1, it will be noted that in the solid line position shown, interengagement between the limit stop surface 152 and the undersurface of an associated hoe member 160 limits relative pivotal movement between the hoe member and the associated actuating arm in one direction.

Each of hoe members 160 initially extends from pivot pin 158 substantially in the same plane as actuating arm 130 as seen in FIG. 2, and then is bent as indicated at 162 so as to extend out of the plane of the actuating arm, and is again bent as indicated at 164 in FIG. 2, so that the remaining part of the hoe member lies in a vertical plane substantially parallel with the vertical plane of the part of the hoe member extending immediately outwardly from the pivot pin. This enables each of the hoe members to extend from one side of the hopper means to the other side thereof without interfering with or engaging the piston rod and sleeve member aforedescribed.

As seen in FIG. 1, each of the hoe members is also bent as indicated by reference numeral 166 so that the outer end 168 thereof extends below the plane of the remainder of the hoe member as seen in FIG. 1. A hoe blade means 170 is secured to the terminal end of portion 168 of the hoe member, this blade means having a generally arcuate configuration so that the lower sharpened scraping edge portion 172 thereof is adapted to conform to the general configuration of the inner portion of the hopper means.

Three spaced wear plates 176 are secured as by welding to the inner surface of the hopper means and are adapted to engage the hoe blade means so as to prevent undue wear of the hoe blade means to the inner portion of the hopper means. It is apparent that the wear plate means is provided with a configuration which substantially conforms to and is complementary to the shape of the inner portion of the hopper means.

Three hoe member guide means are provided each of these guide means being indicated by reference numeral 180, it being noted as seen in FIGURE 2 that each of these guide means is generally U-shaped in configuration, and the opposite end portions 182 of each of these guide means are suitably secured as by welding to the inner surface of the hopper means. These hoe member guide means are adapted to engage the hoe members and guide movement thereof at certain stages of operation of the apparatus as hereinafter explained.

The hopper 10 is fed continuously with material through an opening O provided in cover 30. Any suitable feed conveyor such as a conventional belt or bucket conveyor may be used but for convenience I have shown an endless belt conveyor 183 trained around an end roller 184 and enclosed by a housing 185.

*Operation*

In order to understand the operation of the apparatus, let it be assumed that the ram means is at the upper limit of movement as indicated in full lines in FIGS. 1 and 2 and as indicated schematically in FIG. 3. It will be noted that in this position the piston 52 is in the uppermost portion of pneumatic cylinder 54, ram means 40 is at the upper portion of the ram guide means 46 within the hopper means, the actuating arms 130 are supported adjacent the upper part of the associated wear plates 154, and the hoe members 160 are supported on surface 152 of member 150 whereby the rake means 170 is suspended in the position shown.

To initiate operation, an operator pushes the on button of the switch 112 which actuates the pneumatic relay timer 116 which in turn provides a signal to the high limit switch 84 which actuates solenoid valve 100 to open the port in the valve to allow fluid pressure to pass to the top of pneumatic cylinder 54. This moves the piston 52 along with the piston rod and the associated sleeve 56, the hoe means, and the ram means in a downward direction at a determined speed controlled by the timer to correlate with the rotation of shaft 24.

As the ram means moves downwardly, it forces material at the lower portion of the hopper means downwardly through the outlet means 14 and neck portion 16 into the casing 20 whereupon the material is picked up by feed screw 24 and moved to the left within the casing. The ram means eventually moves into the phantom line position illustrated in FIG. 1 at the bottommost limit of its stroke. Guide means 46 assures proper movement of the ram means during this stage of operation.

As the ram means moves downwardly, the actuating arms pivotally interconnected therewith move downwardly and are turned into the final phantom line position shown in FIG. 1. The center of the pivot pin 158 shown in FIGURE 1 moves through points indicated sequentially by letters $a$ and $b$, the letter $b$ representing the final position of the center of the pivot pin at the lowermost portion of the stroke of the ram means.

As the actuating arm moves through its various positions, each hoe member and the associated blade means sequentially move toward the position $b'$ representing the position of the hoe member and rake means at the lowermost portion of the stroke of the ram means.

It will be noted that as the ram means initially moves downwardly, each hoe member will move down until the undersurface thereof engages an upper portion of the associated hoe member guide means whereupon the hoe member will rest upon the hoe member guide means for a period of time until the ram means nears its lowermost position whence the arm 160 disengages from the surfaces 152 and 152a and lifts the hoe member, each hoe member finally assuming the phantom line position $b'$ shown in FIG. 1. The slope of wall 12 is such that the phantom line position $b'$ is no lower than shown.

At the lowermost portion of the stroke of the ram means, arm 64 engages and actuates the low limit switch 82 which in turn actuates the solenoid valve so as to open the port in the valve to the bottom of the pneumatic cylinder 54 which causes the piston within the cylinder and the associated ram means and hoe means to reverse direction and move in an upward direction to return to the full line position. The timer is suitably adjusted so that the upward movement of the components is at a faster speed than the downward movement thereof. At the end of the upward stroke of the ram means, the arm 64 will again engage the high limit switch to start a complete new cycle. It is apparent that the apparatus can accordingly be continuously operated in this manner.

It will be noted that as the ram means moves upwardly, each hoe blade means moves downwardly along the associated wear plate means and laterally across guides 180 in the direction of the arrows $c$ in FIGURE 1, and as indicated by the progress in phantom line positions, to direct material downwardly and inwardly toward the lower discharge portion of the hopper means thereby assuring that the discharge end of the hopper is constantly refilled and enabling a uniform and steady flow of material to be urged outwardly of the hopper means by the ram means. At the same time, the fingers 140 and 142 move upwardly and downwardly through the material within the hopper means to prevent bridging of the material.

It is apparent from the foregoing that there is provided according to the present invention new and novel feeder apparatus which is particularly adapted for feeding pulverulent or granulated products wherein ram means is employed for ejecting material from the feeder apparatus. Means is provided in the form of hoe means within the hopper means of the structure to upset and move the material in the hopper means at all times so that the material will move downwardly toward the center of the hopper to constantly refill the discharge end of the hopper so that the ram means can feed a uniform and steady flow of material from the hopper means. Means is also provided for preventing bridging of the material within the hopper means. The over-all structure is quite simple and inexpensive in construction and yet is quite efficient and reliable in operation.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. Feeder apparatus comprising hopper means having a downwardly converging side portion and including an outlet means at the bottom portion thereof, ram means disposed within said hopper means and being mounted for reciprocation toward and away from said outlet means, guide means within said hopper means for guiding movement of said ram means, hoe means including an elongated actuating arm being pivotally interconnected at one end thereof with said ram means, wear plate means disposed on the inner surface of the side portion of said hopper means and being adapted to engage said actuating arm, said hoe means including an elongated hoe member pivotally interconnected at one end thereof with the opposite end portion of said actuating arm, limit stop means on said actuating arm for engaging said hoe member for limiting pivotal movement of said hoe member with respect to said actuating arm in one direction, said hoe member having hoe blade means at the opposite end portion thereof, additional wear plate means on the inner surface of the side portion of said hopper means for engaging said hoe blade means, and guide means for said hoe means, said last-mentioned guide means being secured to the inner surface of the side portion of said hopper means and extending inwardly therefrom and engaging said hoe member.

2. Apparatus as defined in claim 1 including a hollow casing in communication with the outlet means of said hopper means, and conveying means disposed within said casing.

3. Feeder apparatus comprising hopper means having a downwardly converging side portion and an outlet means at the lower part thereof, a hollow casing in communication with the outlet means of said hopper means, conveying means within said casing, ram means mounted within said hopper means for reciprocation toward and away from said outlet means, power actuating mechanism connected with said ram means for reciprocating the ram means within the hopper means, guide means within the hopper means for guiding movement of said ram means, said guide means being mounted adjacent the outlet means of the hopper means, hoe means disposed within said hopper means and including a plurality of actuating arms each of which is pivotally interconnected at one end portion thereof with said ram means, a first plurality of wear plate means disposed on the inner surface of the side portion of said hopper means for engaging said actuating arms, said hoe means including a plurality of hoe members, each of said hoe members being elongated and being pivoted at one end thereof to one of said actuating arms and having blade means at the opposide end thereof, each of said actuating arms including limit stop means for engaging the associated hoe member and for limiting pivotal movement of the associated hoe member with respect to the actuating arm, a second plurality of wear plate means on the inner surface of the side portion of said hopper means for engaging the hoe blade means on the various hoe members, each of said actuating arms including finger means extending laterally therefrom for movement through material disposed within the hopper means to prevent bridging of the material, a plurality of hoe member guide means, each of said hoe member guide means being secured to the inner surface of the side portion of said hopper means and extending inwardly therefrom and being generally U-shaped in configuration and adapted to engage one of said hoe members, whereby upon reciprocatory movement of said ram means, said actuating arms move slidably along the associated wear plate means, and said hoe blade means are adapted to move slidably along the associated wear plate means to assure uniform and steady flow of material through the outlet means of the hopper means.

4. Feeder apparatus including: hopper means comprising enclosing wall means having an outlet means at a lower end thereof; means mounted for movement in said hopper means to feed material toward said outlet means; rake means supported for movement in an upper portion of said hopper means; means guiding said rake means for at least a portion of its motion in a generally lateral raking path having no substantial vertical component from a radially outward position more adjacent said wall means to a position spaced radially inward thereof; and drive means for said material feeding means and for moving said rake means.

5. The combination defined in claim 4 in which said guide means includes a laterally inwardly extending guide on said wall means in the path of said rake means.

6. The combination defined in claim 4 in which said means for feeding material toward said outlet means comprises a generally vertically reciprocating ram and said rake means is connected to said ram which moves said rake means laterally on the upstroke of said ram.

7. Feeder apparatus including: hopper means comprising downwardly inclined enclosing wall means having an outlet means at a lower end thereof; rake means supported for movement in said hopper means comprising a generally radially extending arm extending over to a point on said wall means and a generally upwardly projecting extension therefor extending generally in the return direction diametrically over toward a generally opposite point on said wall means, there being rake means provided on said extension; and means moving said rake arm upwardly and downwardly so that said arm cams on said wall means during upward movement of said arm and moves said rake means between a radially outward position more adjacent said wall means and a position spaced radially inward thereof.

8. The combination defined in claim 7 in which said means moving said rake arm comprises a reciprocating ram operable on its down stroke to extend into and push material through said outlet means; and said arm is connected thereto to reciprocate therewith.

9. The combination defined in claim 8 in which said arm has a radially outward arcuate portion and said extension is pivoted thereto.

10. The combination defined in claim 9 in which said rake means comprises a downwardy projecting member on the free end of said extension and a guide on said wall means projects radially inwardly therefrom in a position to be engaged by said extension inwardly of said member.

11. The combination defined in claim 9 in which said arm carries stop means to limit downward pivoting movement of said extension.

12. The combination defined in claim 7 in which said rake means on said extension comprises laterally extending projections thereon.

13. Feeder apparatus including: hopper means comprising wall means having an outlet means at the one end thereof; ram means mounted for generally axial inward and outward reciprocating movement in said hopper means to feed material to said outlet means; rake means including a part mounted on said reciprocating ram means and having axial movement in said hopper means therewith; means on the outward stroke of said part relative to said outlet means moving said rake means from a radially outward position more adjacent said wall means to a position spaced radially inward thereof; and drive means for said ram means.

14. The combination defined in claim 13 in which said hopper means has generally converging wall means and means on said rake means operable to engage said converging wall means and convert upward movement of said part into downward movement of said rake means.

15. Feeder apparatus including: axially extending hopper means having an outlet means at one end thereof; material advancing means mounted for movement in said hopper means to feed material axially toward said outlet means; rake means supported for movement in said hopper means; means guiding said rake means for at least a portion of its motion in a raking path at a substantially right angle to the axis of said wall means from a radially outward position more adjacent said wall means to a position spaced radially inward thereof; and drive means for said material feeding means and for moving said rake means.

16. Feeder apparatus including: hopper means comprising enclosing wall means having an outlet means at one end thereof; rake means supported for movement in said hopper means comprising a generally radially extending arm having a rake member projecting angularly therefrom; means moving said rake arm toward and away from said outlet means; and means, during away movement of said rake arm, moving said rake member from a radially outward position inwardly to a position spaced radially inward thereof.

References Cited by the Examiner

UNITED STATES PATENTS

| 1,366,615 | 1/1921 | Westlund | 222—245 X |
| 2,204,097 | 6/1940 | Montgomery | 222—245 X |
| 2,639,072 | 5/1953 | Goldberg | 222—245 |

FOREIGN PATENTS 99,337  1/1962  Norway.

ROBERT B. REEVES, *Primary Examiner.*

HADD S. LANE, *Examiner.*